(No Model.)
W. T. HARRIS, Jr.
HEDGE FENCE.
No. 428,754. Patented May 27, 1890.
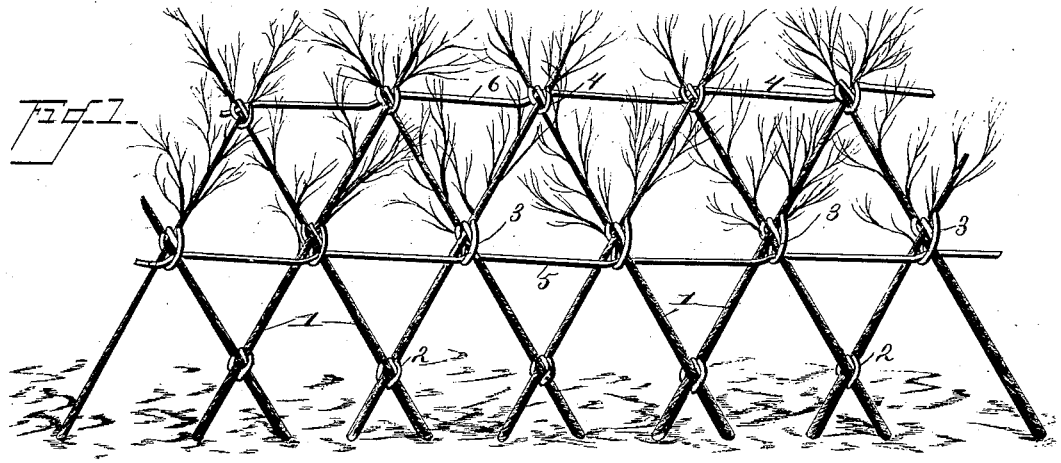
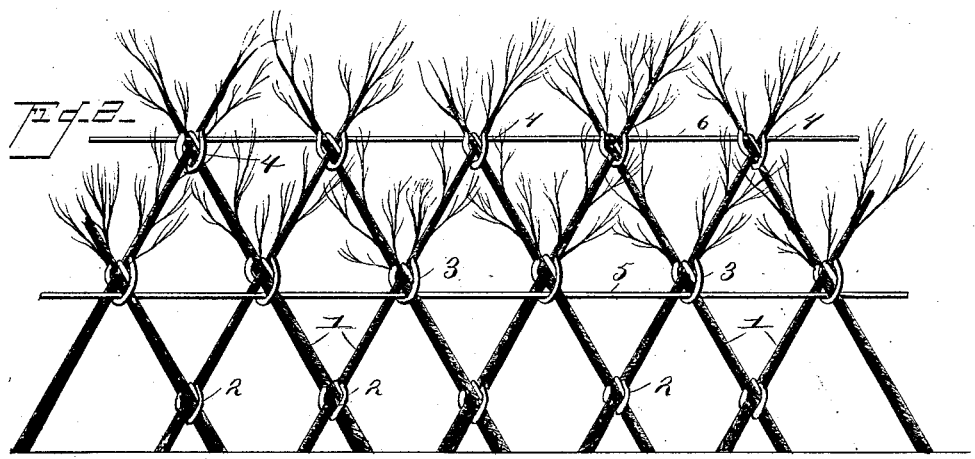
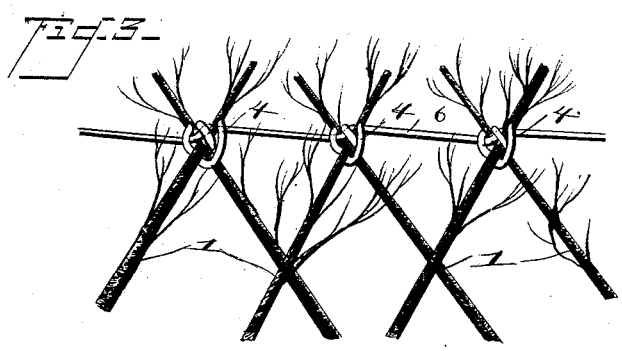
Witnesses
Geo. E. Fuch.
J. F. Riley
Inventor
William T. Harris, Jr.
By his Attorneys
C. A. Snow & Co.

UNITED STATES PATENT OFFICE.

WILLIAM TYLER HARRIS, JR., OF MOUNT STERLING, KENTUCKY.

HEDGE FENCE.

SPECIFICATION forming part of Letters Patent No. 428,754, dated May 27, 1890.

Application filed January 16, 1890. Serial No. 337,044. (No model.)

*To all whom it may concern:*

Be it known that I, WILLIAM TYLER HARRIS, Jr., a citizen of the United States, residing at Mount Sterling, in the county of Montgomery and State of Kentucky, have invented a new and useful Hedge Fence, of which the following is a specification.

The invention relates to improvements in hedge-fences.

The object of the present invention is to provide a hedge fence in which the plants will be securely intertwined and prevented separating from the fence and growing in a reverse direction and in which the plants will, as they grow, become tighter and more securely retained in place.

A further object of the invention is to provide a hedge fence in which the wires employed for retaining the plants in their desired position will securely clamp them in the manner not to completely encircle the plants and obstruct the flow of sap.

The invention consists in the construction and novel combination and arrangement of parts hereinafter fully described, illustrated in the accompanying drawings, and pointed out in the claim hereto appended.

In the drawings, Figure 1 is a perspective view of a hedge fence constructed in accordance with my invention. Fig. 2 is a side elevation. Fig. 3 is an enlarged detail view illustrating the manner of securing the upper ends of adjacent plants together.

Referring to the accompanying drawings, 1 designates plants which are arranged at intervals, and are inclined in opposite directions, those inclining in the same direction being parallel. The plants cross each other at the bottom, middle, and top of the frame and the number of points crossing vary with the height of the fence, and the plants are secured together at the points of crossing by wire loops or ties 2, 3, and 4, which are driven in the plants. The loops or ties 2, 3, and 4 are constructed by bending small pieces of wire around the plants at their points of crossing and driving the ends of the wire into the plants, and as the plants grow older they increase in size and more completely fill the loops or ties and thereby make the fence tighter. The wire loops or ties 2 are arranged near the bottom of the fence and the wire ties or loops 3 are slightly larger than the loops 2, and secure the plants together near the middle of the fence and are adapted to support a wire 5, which is passed between the plants back of one and in front of the other, and vice versa, throughout the entire length of the fence. The wire 5 is passed through the loops 3, and is held thereby in contact with the plants and is adapted to support the latter and strengthen the fence. The plants are held together near their upper ends and the form of the fence preserved by a wire 6, which is passed around back of one plant, then in front of the next adjacent plant, and so on throughout the fence, the wire-ties 4 serving to hold the plants together and to retain the wire in the crotch formed by the crossing plants. It will thus be seen that the plants are securely held together and retained in their proper position in the fence by wires that do not pass entirely around any single plant, and as the plants grow the fence becomes tighter, but there is no danger of the flow of the sap being stopped and the plants destroyed.

From the foregoing description and the accompanying drawings the construction, operation, and advantages of the invention will be readily understood.

Having thus described my invention, what I claim is—

A hedge fence composed of a series of plants inclined in one direction and a series of plants inclined in the opposite direction, the plants inclining in the same direction being arranged parallel with each other, the wire loops, staples, or ties 2, 3, and 4 securing the plants together at their points of crossing, the wire 5 extending along the middle of the fence and passing around the back of one plant and in front of the next adjacent plant and being supported by the loops or ties 3, and the wire 6, arranged along the top of the fence and passing around the back of one plant and in front of the next adjacent plant and being held in the crotches of the plants by the wire ties, staples, or loops 4, said wires 5 and 6 passing around the outer faces of both plants at each point of cross, whereby a pull upon a wire will tighten the plants, substantially as and for the purpose described.

In testimony that I claim the foregoing as my own I have hereto affixed my signature in presence of two witnesses.

WILLIAM TYLER HARRIS, Jr.

Witnesses:
  M. R. LAUTZ,
  J. P. BURKE.